United States Patent
Scott et al.

(10) Patent No.: US 11,606,200 B2
(45) Date of Patent: *Mar. 14, 2023

(54) TRUSTWORTHY DATA EXCHANGE USING DISTRIBUTED DATABASES

(71) Applicant: INTUIT INC., Mountain View, CA (US)

(72) Inventors: Glenn C. Scott, Mountain View, CA (US); Michael R. Gabriel, Mountain View, CA (US); Parikshit Lingampally, San Francisco, CA (US); Roger C. Meike, Redwood City, CA (US); Ian Maya Panchevre, Mountain View, CA (US)

(73) Assignee: Intuit, Inc., Mountain View, CA (US)

( * ) Notice: Subject to any disclaimer, the term of this patent is extended or adjusted under 35 U.S.C. 154(b) by 65 days.

This patent is subject to a terminal disclaimer.

(21) Appl. No.: 17/316,829

(22) Filed: May 11, 2021

(65) Prior Publication Data

US 2021/0266155 A1  Aug. 26, 2021

Related U.S. Application Data

(63) Continuation of application No. 16/526,173, filed on Jul. 30, 2019, now Pat. No. 11,038,674, which is a
(Continued)

(51) Int. Cl.
*H04L 9/40* (2022.01)
*H04L 9/08* (2006.01)
(Continued)

(52) U.S. Cl.
CPC ........ *H04L 9/0838* (2013.01); *G06F 21/6218* (2013.01); *H04L 9/30* (2013.01);
(Continued)

(58) Field of Classification Search
CPC ......... H04L 9/0838; H04L 9/30; H04L 9/321; H04L 9/3236; H04L 9/3247; H04L 9/50;
(Continued)

(56) References Cited

U.S. PATENT DOCUMENTS

| 2002/0004900 A1* | 1/2002 | Patel | H04L 63/0407 713/155 |
| 2016/0127134 A1* | 5/2016 | Goldstone | H04L 63/18 726/7 |

(Continued)

FOREIGN PATENT DOCUMENTS

| EP | 263999 A2 | 4/1988 |
| EP | 2639999 A1 | 9/2013 |

OTHER PUBLICATIONS

International Search Report/ Written Opinion issued in PCT/US2017/035642 dated Feb. 8, 2018.

*Primary Examiner* — Michael S McNally
(74) *Attorney, Agent, or Firm* — Patterson + Sheridan, LLP

(57) ABSTRACT

The present disclosure relates to a trustworthy data exchange. Embodiments include receiving, from a device, a query, wherein the query comprises a question. Embodiments include identifying particular information related to the query. Embodiments include receiving credentials from a user for retrieving the particular information related to the query. Embodiments include retrieving, using the credentials, the particular information related to the query from one or more data repositories that are part of a distributed database comprising an immutable data store that maintains a verifiable history of changes to information stored in the distributed database. Embodiments include determining, based on the particular information related to the query, an answer to the query. Embodiments include providing the answer to the device.

20 Claims, 5 Drawing Sheets

Related U.S. Application Data continuation of application No. 15/610,128, filed on May 31, 2017, now Pat. No. 10,412,087.

(51) Int. Cl.
| | |
|---|---|
| *H04W 12/02* | (2009.01) |
| *H04W 12/033* | (2021.01) |
| *H04W 12/106* | (2021.01) |
| *H04W 12/108* | (2021.01) |
| *H04L 9/32* | (2006.01) |
| *G06F 21/62* | (2013.01) |
| *H04L 9/30* | (2006.01) |
| *H04L 9/00* | (2022.01) |

(52) U.S. Cl.
CPC ............ *H04L 9/321* (2013.01); *H04L 9/3236* (2013.01); *H04L 9/3247* (2013.01); *H04L 63/0407* (2013.01); *H04L 63/0823* (2013.01); *H04L 63/0853* (2013.01); *H04L 63/0884* (2013.01); *H04L 63/12* (2013.01); *H04W 12/02* (2013.01); *H04W 12/033* (2021.01); *H04W 12/106* (2021.01); *H04W 12/108* (2021.01); *H04L 9/50* (2022.05); *H04L 2209/42* (2013.01); *H04L 2209/56* (2013.01)

(58) Field of Classification Search
CPC ............. H04L 63/0407; H04L 63/0823; H04L 63/0853; H04L 63/0884; H04L 63/12; H04L 2209/42; H04L 2209/56; H04W 12/106; H04W 12/108; H04W 12/033; H04W 12/02; G06F 21/6218
USPC ......................................................... 713/155
See application file for complete search history.

(56) References Cited

U.S. PATENT DOCUMENTS

| | | | |
|---|---|---|---|
| 2016/0241532 A1* | 8/2016 | Loughlin-Mchugh | ....................... H04W 12/06 |
| 2018/0025181 A1* | 1/2018 | Barinov | ................ G06F 21/645 726/26 |

* cited by examiner

TRUSTWORTHY DATA EXCHANGE USING DISTRIBUTED DATABASES

CROSS-REFERENCE TO RELATED APPLICATIONS

This Application is a continuation of and hereby claims priority under 35 U.S.C. § 120 to pending U.S. patent application Ser. No. 16/526,173, filed on Jul. 30, 2019, which is a continuation of U.S. patent application Ser. No. 15/610,128, filed on May 31, 2017, the contents of both of which are incorporated by reference herein in their entirety.

BACKGROUND

Embodiments presented herein generally relate to security and authentication in the exchange of information, and more specifically to a trustworthy exchange of information using distributed databases.

As electronic methods of exchanging information continue to progress, security and reliability have become primary concerns. When an entity needs to provide information to fulfill a request, such as for the purpose of identity verification, the entity may wish to provide only the information that is required to fulfill the request; for identity verification this could be to provide only the information requested, and only to the intended recipient. Furthermore, to verify the identity of the entity, the recipient of the information wants to know that the information is accurate and trustworthy. Both of these objectives can be challenging in the context of an electronic data exchange, where identity information can be easily created, forged, accessed, shared, and modified. As such, the creation of electronic identity information leads to difficulties in identity verification, as there is no guarantee that identity information provided electronically is authentic.

In some cases, a particular piece of information to be shared may be contained within a larger sensitive data set that is otherwise irrelevant. For example, when an individual provides a driver's license to demonstrate the individual's age, the recipient will be able to see additional information such as the individual's home address. This problem of over-sharing sensitive information is difficult to avoid, because without an authoritative document such as a driver's license, which contains additional sensitive information, it may be difficult for the recipient to ascertain the reliability of the individual's claim to be a certain age. When information is exchanged electronically, these problems become particularly pronounced due to the volatile nature of electronic information.

SUMMARY

One embodiment of the present disclosure includes a computer-implemented method for a trustworthy data exchange between a first device and a second device. The method generally includes receiving, from the second device, a query, wherein the query comprises a question and an indication of a trusted authority that is to certify authenticity of information used to determine an answer to the query. The method further includes identifying information related to the query. The method further includes receiving credentials from a user for retrieving the information. The method further includes retrieving, using the credentials, information related to the query from one or more data repositories storing data verified by the trusted authority. The method further includes determining, based on the information, an answer to the query. The method further includes providing the answer to the second device, wherein the answer indicates that the answer is based upon information certified by the trusted authority.

Another embodiment of the present disclosure includes a processor and a memory storing a program, which, when executed on the processor, performs the method for trustworthy exchange.

Still another embodiment provides a non-transitory computer-readable storage medium having instructions, which, when executed on a processor, performs the method for trustworthy exchange.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

DETAILED DESCRIPTION

Existing methods of providing information for authentication purposes (e.g., identity verification) generally involve the use of physical documents (e.g., driver's license, birth certificate, social security card, passport, and the like) or electronic records of relevant information (e.g., photo of driver's license). These methods often result in over-sharing of sensitive information (e.g., the recipient can see an address on a driver's license, and this is unnecessary for identity verification) and a lack of reliability (e.g., the recipient may be unable to verify that a photo of a driver's license is not fraudulent).

According to embodiments of the present disclosure, a user maintains verified information within trusted repositories maintained in a data store by one or more trusted authorities, and the verified information is used to provide specific answers in response to limited queries from requesting parties upon user approval. For example, a requesting party may use an application running on a mobile device to submit a query to a companion application on the user's mobile device, which retrieves verified information about the user from the data store in order to respond, on user approval, to the query.

The data store may comprise a distributed database such as a blockchain. Distributed databases generally provide a shared, immutable ledger for recording data. In the context of the present disclosure, a blockchain may be used to store information about a plurality of users, and the provenance of each piece of information may be verified by a particular trusted authority which manages a portion, or repository, of the blockchain. While the example of a blockchain is used herein, embodiments of the present disclosure may be implemented with other types of data stores which provide similar functionality.

Figure 1:
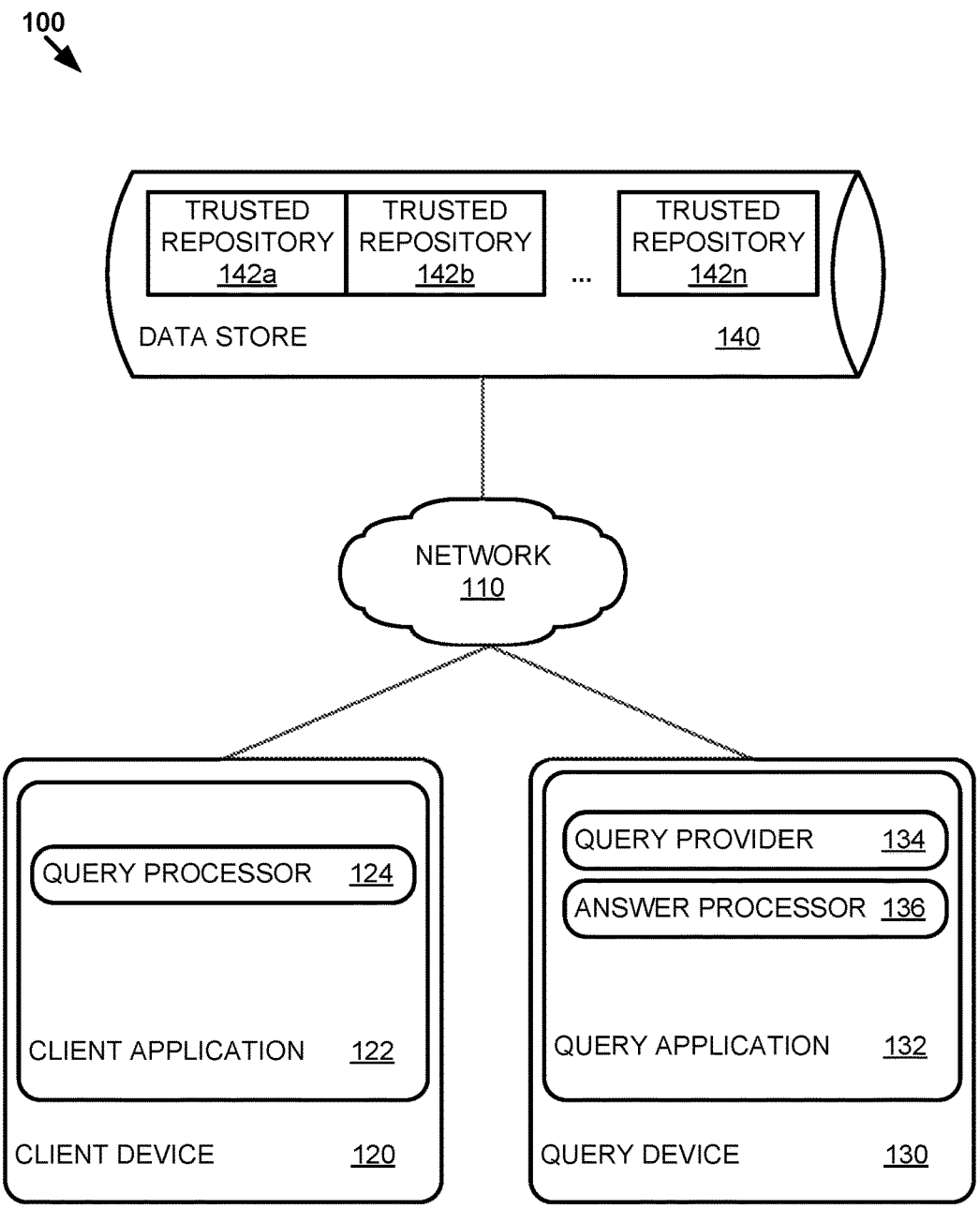
FIG. 1 illustrates an example computing environment in which certain embodiments of the present disclosure may be implemented.

FIG. 1 illustrates an example computing environment 100 in which certain embodiments of the present disclosure may be implemented. Computing environment 100 includes a client device 120, a query device 130, and a data store 140, connected via a network 110. In general, query device 130 provides a query to client device 120, which retrieves trusted information relevant to the query from data store 140 and uses the trusted information to determine an answer to the query and provide the answer to query device 130.

In some embodiments, client device 120 comprises a computing device such as a mobile phone, PDA, tablet, server, laptop, or desktop computer. In other embodiments, client device 120 may comprise a virtual device executing on one or more computing devices such as mobile phones, PDA, tablets, servers, laptops, or desktop computers. Client device 120 may, in some embodiments, comprise a stateless device (e.g., a computing device that does not store any unique software configuration or state and is used for its computational resources). Client device 120 executes a client application 122 which may, for example, comprise a software entity which performs operations for a trustworthy data exchange. In some embodiments, client application 122 executes entirely on client device 120, while in other embodiments application 122 may be implemented as a remotely hosted service which client device 120 accesses (e.g. through Application Programming Interface calls), or a combination of local and remote performance of operations. Client application 122 comprises a query processor 124, which receives, processes, and responds to queries (e.g., received from query device 130).

A query received from query device 130 may comprise a question and an indication of one or more trusted authorities by which the answer is to be certified. For example, a query may comprise the question "have you reached the age of 21?", and specify that the answer must be certified by the state department of vital statistics. Query processor 124 may process the received query to determine the information to be retrieved from data store 140 in order to respond to the query (e.g., the user's birthday). Processing the query may involve identifying a particular trusted repository 142 within data store 140 which contains the information, and which is maintained by a trusted authority (e.g., the state department of vital statistics) identified in the query. Client application 122 may then prompt the user of client device 120 for credentials to use in retrieving the information from the trusted repository 142. These credentials may include, for example, account login information for a user-maintained account with the trusted repository 142 within which the relevant information is stored. Client application 122 may then retrieve the information from the trusted repository 142 within data store 140 by transmitting a data request along with the credentials for accessing the user-maintained account on the trusted repository 142. In response to the data request, client device 120 retrieves the specified information from data store 140, and query processor 124 uses the information to determine an answer to the query, and then provides the answer to query device 130 (e.g., by transmitting the answer over network 110). The answer may, in some embodiments, include a digital signature that identifies the trusted authority upon which it is based (e.g., the state department of vital statistics). The digital signature may, for example, comprise a cryptographic hash that is decoded by query device 130 using the trusted authority's public key or other data that can be used to verify the authenticity of the data retrieved from trusted repository 142.

Query device 130 may comprise a computing device such as a mobile phone, PDA, tablet, server, laptop, or desktop computer. In other embodiments, query device 130 may comprise a virtual device executing on one or more computing devices such as mobile phones, PDA, tablets, servers, laptops, or desktop computers. Query device 130 may, in some embodiments, comprise a stateless device (e.g., a computing device that does not store any unique software configuration or state and is used for its computational resources). While query device 130 and client device 120 are depicted as separate devices, some embodiments involve both query device 130 and client device 120 being located (e.g., as virtual devices) on the same device. Query device 130 may, for example, be operated by an entity that requests information regarding the user of client device 120. Query device 130, as illustrated, executes a query application 132 that performs operations for initiating and processing a trustworthy data exchange between query device 130 and a client device 120. Query application 132 may, for example, comprise a companion application to client application 122. Query application 132 and client application 122 may communicate with one another over network 110 (e.g., the internet) in order to perform a trustworthy data exchange according to embodiments of the present disclosure. Query application 132 comprises query provider 134 and answer processor 136.

Query provider 134 may allow a user of query device 130 to define a query or select a query that has been defined in advance (e.g., defined previously by the user, downloaded from a third party, or the like). For example, the user of query device 130 may define a query through a user interface of query provider 134 by entering a question and identifying one or more trusted authorities by which the answer must be certified. In another embodiment, the user may select a query that has been defined in advance (e.g., downloaded or included as part of query application at the time of installation). Query provider 134 may then provide the query to client device 120 (e.g., by transmitting the query over network 110).

Answer processor 136 may receive an answer to a query (e.g., from client device 120), and determine whether the answer is certified by a trusted authority identified in the query. For example, answer processor 136 may determine whether the answer contains the digital signature of a trusted authority identified in the query by decoding the digital signature (e.g., cryptographic hash) included in the answer using a public key associated with the trusted authority. Answer processor 136 may then display the answer to the user of query device 130. In some embodiments, answer processor 136 may automatically make a determination based on the answer (e.g., if the purpose of the query is to determine whether to grant access to an electronic system, answer processor 136 may automatically grant or deny access to the electronic system based on the answer).

Data store 140 may, for example, comprise a data storage entity that is accessible over network 110. In an alternate embodiment, data store 140 may be contained, at least partially, within client device 120, or may be distributed across a plurality of storage entities. Data store 140 may be associated with, and accessible by, client application 122 and/or query application 132. For example, client application 122, query application 132, and data store 140 may all be a part of a trusted environment.

In some embodiments, data store 140 comprises a secure distributed digital ledger such as a blockchain. In alternative embodiments, data store 140 comprises one or more databases. Data store 140 comprises a plurality of trusted repositories 142*a-n*, each which is maintained by a different trusted authority, and each of which contains information about a plurality of users. A trusted authority may be deemed trustworthy by, for example, a corporate entity that maintains the trusted environment within which client application 122, query application 132, and data store 140 communicate. In another embodiment, trusted authorities may be deemed trustworthy by a governmental entity. Information within a trusted repository 142 may be associated with user accounts that are accessible to users over network 110. For example, a user may maintain a collection of information on data store 140 within a user account on a trusted repository 142, secured by user credentials, and each piece of information may be verified as accurate by the trusted authority that maintains the trusted repository 142. For example, a user account on a trusted repository 142 maintained by the state department of vital statistics may store the user's birthday, and the birthday may be certified as accurate by the state department of vital statistics.

In some embodiments, dependencies may exist among information in the trusted repositories. For example, an address on the user's driver's license may be connected to the user's address maintained on a governmental agency's trusted repository. Such connected information may be synchronized, such that a change to one information item results in a corresponding change to another information item, in the same or a different trusted repository, which depends upon the piece of information. For example, if the user's address is updated in a trusted repository maintained by the US Post Office, the user's driver's license maintained by the Department of Motor Vehicles may also be automatically updated to identify the new address.

User information may, for example, be accessible by client application 122 on client device 120 when the appropriate user credentials are provided. When query application 132 on query device 130 provides a query to client application 122 on client device 120, for example, client device 120 may retrieve information related to the query from data store 140 using credentials provided by the user of client device 120 in order to answer the query while affirming the provenance of the data. The trusted repositories 142 on data store 140 may contain a series of transactional information within a user account, such that the transactional history can be verified. For example, if the state department of vital statistics maintains a trusted repository 142, a user account within the trusted repository 142 may contain a series of sequential updates to the user's driver's license information (e.g., representing each time the user's driver's license is renewed). The user account within the trusted repository may also maintain all instances in which the user's information was accessed or viewed (e.g., for the purpose of auditing how the data is consumed by third-parties, not just how the data changes over time).

In certain embodiments, monetization contracts may be supported, such that one party may charge a fee for allowing another party to access or consume their information. For example, an employer may be charged (e.g., by a trusted authority and/or a user) to access information in a trusted repository about a user who is a prospective employee of the employer. Different fees may be associated with different access parameters (e.g., a single access may be cheaper than unlimited access to an information item).

Client applications 122, query application 132, and data store 140 may communicate in a trusted environment that is certified by a trusted source (e.g., the manufacturer of client device 120 and/or query device 130, the application developer, etc.). As such, all parties may rely upon the security and trustworthiness of the data exchanged. In some embodiments, a shared secret may be established between client device 120 and query device 130 to establish a secure connection and protect the data from being accessed by an unauthorized party. For example, the shared secret may comprise cryptographic keys, numbers, and/or addressing information (e.g., Media Access Control (MAC) addresses).

While the various components of computing environment 100 are depicted separately in FIG. 1, one or more of the components may be implemented either together or separately, or certain functions may be distributed across a plurality of physical or virtual devices.

Figure 2:
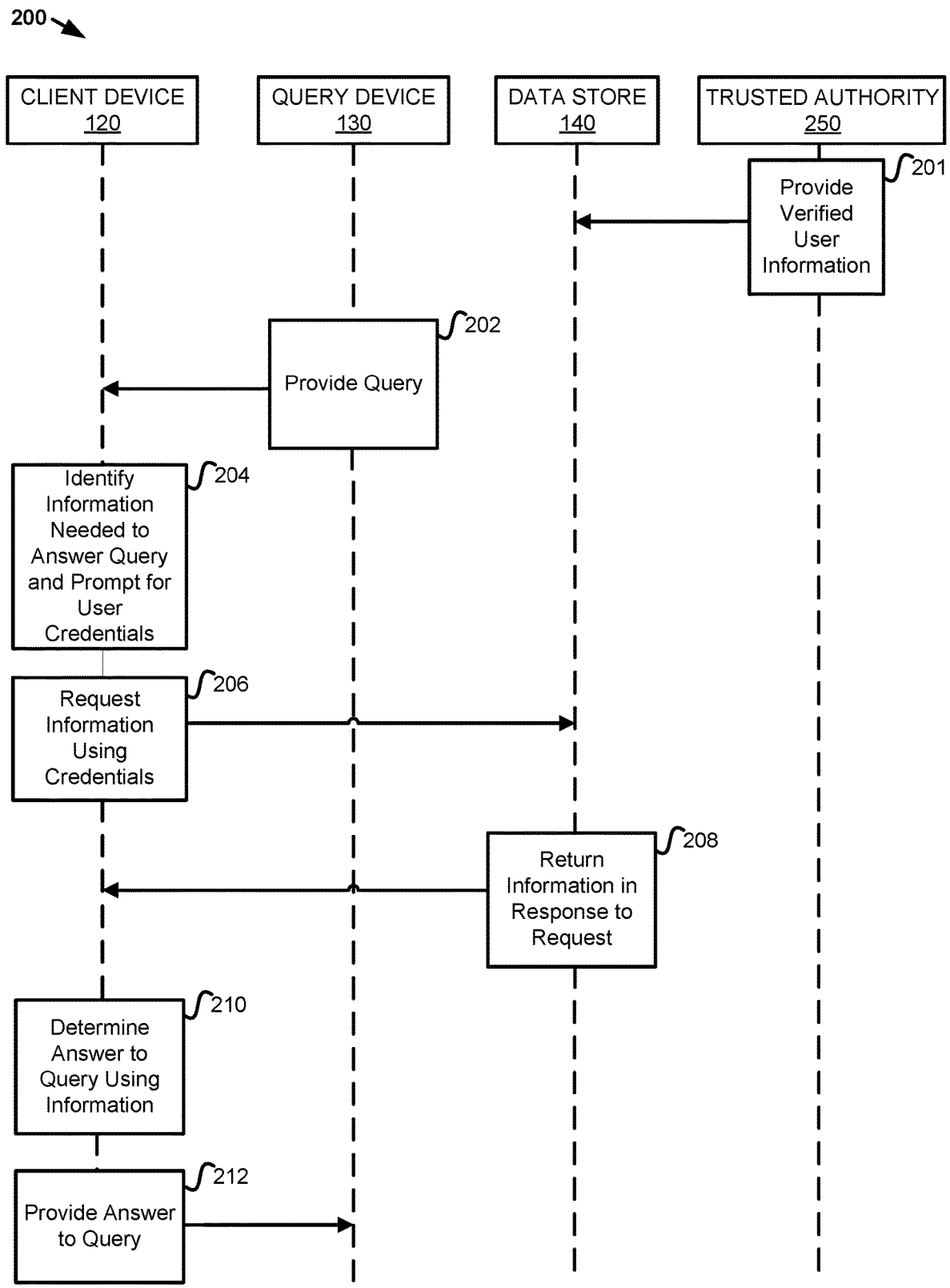
FIG. 2 is a message flow diagram illustrating messages exchanged between a client device, a query device, and a data store for a trustworthy data exchange.

FIG. 2 is a message flow diagram 200 illustrating messages exchanged between client device 120, query device 130, data store 140, and a trusted authority 250 for a trustworthy data exchange according to certain embodiments of the present disclosure. Trusted authority 250 may comprise an entity that maintains a trusted repository 142 on data store 140, and may, for example, communicate with data store 140 using a computing device connected to a network (e.g., the internet, a wired or wireless network, or the like). A trusted authority may be deemed trustworthy by, for example, a corporate entity that maintains a trusted environment within which client application 122, query application 132, and data store 140 communicate. In some embodiments, one or more of the messages depicted are exchanged over a secure connections established (e.g., using a shared secret) between client device 120 and query device 130 before 202 in message flow diagram 200. For example, query device 130 may request to initiate a secure communication session with client device 120, and, upon approval by the user of client device 120, client device 120 may send a shared secret to query device 130. Client device 120 and data store may, for example, communicate over a network (e.g., the internet, a wired or wireless network, or the like).

At 201, trusted authority 250 provides verified information about a user to data store 140. In some embodiments, the user information provided by trusted authority 250 contains a digital signature that indicates that it is verified by trusted authority 250. For example, trusted authority 250 may maintain a trusted repository 142 within data store 140, which contains information about a plurality of users. Each piece of information provided by trusted authority 250 may be associated with a user of the plurality of users, and the user may be able to access the information on the trusted repository 142 through a user account, which may be secured with user credentials. In some embodiments, each piece of information may be accessible to a plurality of users given various levels of access permissions within trusted repositories 142 of data store 140. In other embodiments, all of the information on data store 140 may be accessible to the public (e.g., if data store is a public blockchain). In alternative embodiments, user information may be provided to data store 140 from another source (e.g., from client device 120) and only verified by trusted authority 250. For example, data store 140 may forward user information it receives to a particular trusted authority 250 (e.g., because the information indicates that it may be verified by that trusted authority), and the trusted authority 250 may indicate to data store 140 whether or not it verifies the authenticity of the user information. Information may also be verified by a plurality of trusted authorities.

In some embodiments, the user information provided to data store 140 at 201 may include a dependency relationship to another piece of user information stored in data store 140. For example, a user's driver's license provided by the Department of Motor Vehicles may contain a dependency relationship with the user's address which is stored in a trusted repository 142 maintained by the US Post Office. Any change to the user's address by the US Post Office may result in the user's driver's license being updated within data store 140 to include the user's changed address.

At 202, query device 130 provides a query to client device 120. For example, after a query has been defined or selected by a user of query device 130, the query may be transmitted to client device 120 over network 110. The query may comprise a question and an indication of one or more trusted authorities that are to verify the information on which the answer is based. In another embodiment, the query may be provided to client device in the form of a bar code, such as a Quick Response (QR) code, displayed on query device 130 and captured using a camera of client device 120, which is discussed in more detail with respect to FIG. 4 below.

At 204, client device 120 identifies the information that will allow it to answer the query and prompts for user credentials. For example, client device 120 may determine a particular piece of information within a user account on a trusted repository 142 of data store 140 that relates to the query. This determination may be made based on an analysis of the query, which may identify the information requested, as well as one or more trusted authorities that are to verify the information. In other embodiments, the user of client device 120 may be prompted to identify the information to be retrieved in order to answer the question. For example, client device 120 may display the query to the user, and the user of client device 120 may identify the information on a trusted repository 142 of data store 140 on which the answer is to be based (e.g., by selecting from a list populated with all of the user's information stored on data store 140). Once the information to be retrieved has been identified, client device 120 may then prompt the user of client device 120 for user credentials to access the user account on the trusted repository 142. The user may, for example, enter user credentials in a user interface associated with client application 122.

At 206, client device 120 requests the information from data store 140 using the user credentials. For example, client device 120 may provide the user credentials to data store 140 in order to access a user account on the trusted repository 142 and retrieve the information. In some embodiments, data store 140 comprises a blockchain, and client device 120 accesses the most recent version of the information (e.g., the latest block in the ledger) stored in a trusted repository 142 of the blockchain. The information to be retrieved may also comprise an older version of the information. For example, if the query asks for the user's address on Jan. 1, 2000, client device 120 may not retrieve the latest block in a ledger storing the user's address, but an older block that is relevant to the date in question. Furthermore, if the requested information contains a dependency on another piece of information within data store 140, the dependency may first be resolved (e.g., a user's driver's license from Jan. 1, 2000 may be dependent on the user's address from Jan. 1, 2000, and so this address will be included in the requested driver's license by accessing the relevant blocks in the blockchain).

At 208, data store 140 returns the information to client device 120. For example, once the user credentials have been authenticated, data store 140 may transmit the information that was requested from the trusted repository 142 over network 110 to client device 120. The information may contain a digital signature that indicates that is certified by the trusted authority that maintains the trusted repository 142.

At 210, client device 120 determines an answer to the query using the information. For example, if the query asks a yes or no question (e.g., "have you reached the age of 21?"), client device 120 uses the information (e.g., the user's birthday) to determine whether the answer is yes or no. In other embodiments, a query may ask a more substantive question, and client device 120 may include all or part of the information in the answer. In some embodiments, the client device 120 also prompts for user approval to provide the answer to query device 130.

At 212, client device 120 provides the answer to query device 130. For example, client device 120 may transmit the answer over network 110 to query device 130. The answer may include the digital signature that indicates that it is based on information certified by the trusted authority. In some embodiments, when monetization contracts are used, client device 120 may request payment from query device 130 (e.g., by sending an invoice and receiving payment information in response) before providing the answer. For example, the information retrieved from trusted repository 142 may contain an indication that it is associated with a particular fee, and client device 120 may request payment accordingly from query device 130.

Figure 3:
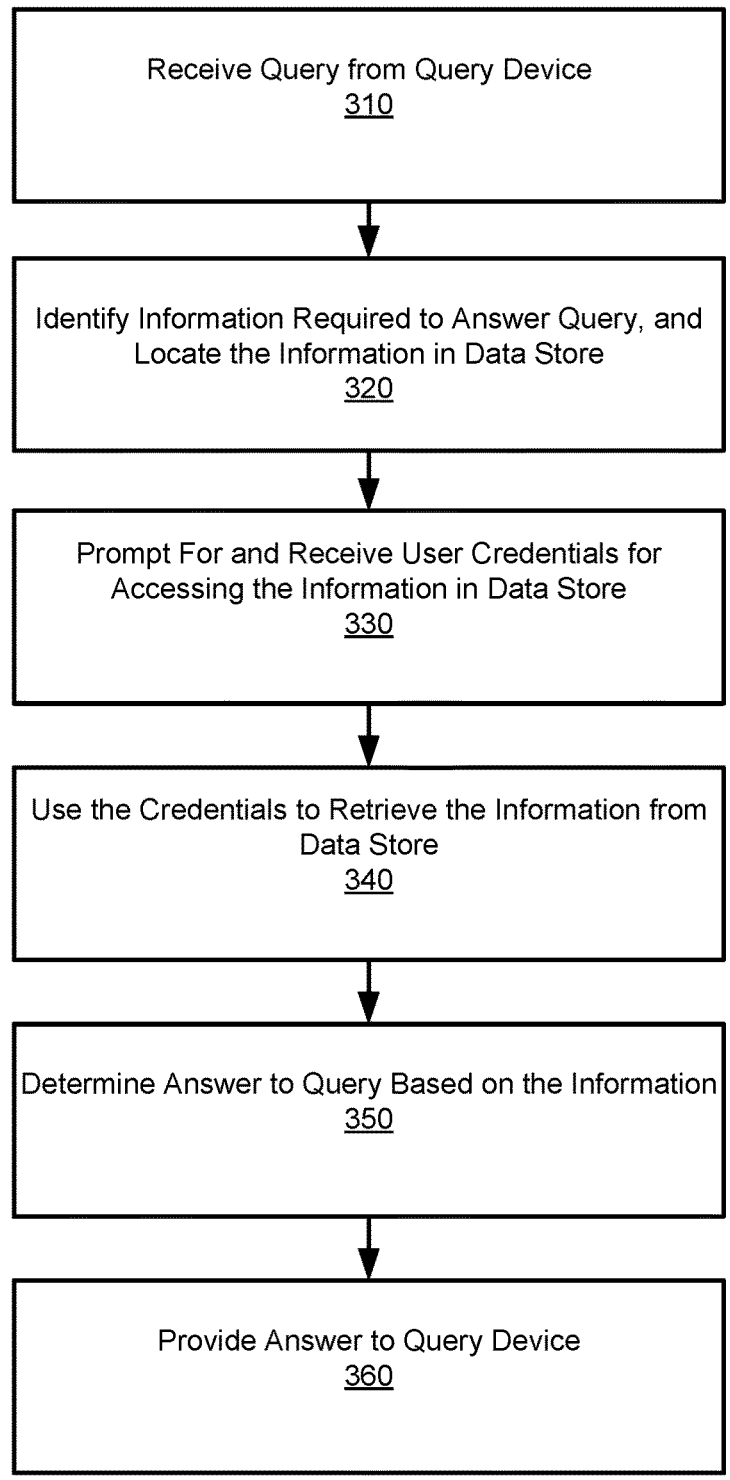
FIG. 3 illustrates example operations for a trustworthy data exchange according to certain embodiments.

FIG. 3 illustrates example operations 300 for a trustworthy data exchange according to certain embodiments. Operations 300 may, for example, be implemented by client device 120.

At 310, client device 120 receives a query from query device 130. For example, a user of query device 130 may wish to verify a piece of information about the user of client device 120, such as the user's age. Accordingly, the user of query device 130 may formulate a query (e.g., "are you at least 21 years old?"), and may indicate the trusted authority by which the answer to the query is to be certified. For example, the query may indicate that the answer must be based on data certified by the state department of vital statistics or by the hospital in which the user of client device 120 was born. In some embodiments, a set of queries may be defined in advance, each query comprising a question and an indication of the trusted authority upon which the answer must be based, and the user of query device 130 may select an appropriate query from the set (e.g., through a user interface of query application 132). Once the user of query device 130 has identified a query, the query is provided to client device 120. The query may be transmitted to client device 120 or, in some embodiments, displayed in a user interface of query application 132 executing on query device 130 so that it may be captured by client device 120. The query may, for example, be displayed in the form of a bar code, such as a Quick Response (QR) code, so that it may be captured by an image capture device, such as a camera, of client device 120. Alternatively, the query may be transmitted from query device 130 to client device 120 (e.g., over the internet, directly via near field communication (NFC), over a cellular network, using Bluetooth, over a wired or wireless network, indirectly via a server, and the like). In other embodiments, client device 120 and query device 130 comprise virtual devices residing on the same device, and communicate via direct data transmissions within the device.

At 320, client device 120 identifies the information which is required to answer the query (e.g., based on analyzing the query, which may identify the requested information as well as one or more trusted authorities which are to certify the requested information, or based on input from the user of client device 120), and locates the information in data store 140. For example, client device 120 may determine that the information is stored in a particular trusted repository 142 of data store 140, and is associated with a user account with the trusted repository 142.

At 330, client device 120 prompts the user for credentials. For example, once client application 122 identifies that certain information must be retrieved from a trusted repository 142 of data store 140 in order to answer the query, the user may be prompted to enter credentials needed to access the user's account on the trusted repository 142. The prompt may, for example, comprise a push notification, email, mobile alert, or the like. The credentials may, for example, comprise a username and password associated with the user account. In some embodiments, data store 140 is a blockchain, and the user's credentials grant the user access to all of the user's information, including all sequential blocks, within a particular trusted repository 142 of the blockchain.

At 340, client device 120 receives the credentials from the user. For example, the user may enter the credentials in response to the prompt through a user interface of client application 122.

At 350, client device 120 retrieves information related to the query from data store 140 using the credentials. For example, client application 122 may provide the credentials to data store 140 along with a request for the information needed to answer the query. If the query asks whether the user has reached a certain age, for example, the information needed may comprise the user's birthday. Furthermore, if the query specifies that the answer must be based on information certified by a trusted authority, the information retrieved from data store 140 must be certified by the trusted authority. The user may have, for instance, requested that the state department of vital statistics certify the user's date of birth, and the state department of vital statistics may have submitted this certification for storage in the user's account on the trusted repository 142 which it maintains. The user's credentials may then be used to retrieve the user's date of birth, certified by the state department of vital statistics, from the user's account on the trusted repository 142. When the data store 140 is a blockchain, the information may be retrieved from a particular block in the blockchain (e.g., the latest entry in the ledger).

At 360, client device 120 determines an answer to the query based on the information retrieved from data store 140. For example, if the query asks whether the user has reached a certain age, and the information retrieved from data store 140 comprises the user's date of birth, client device 120 uses the user's date of birth to determine whether the user has reached the certain age. The answer may, in some cases, comprise a "yes" or "no" response without including the information itself. In some embodiments, the answer may also include a digital signature that indicates the trusted authority that certifies the information upon which it is based (e.g., the state department of vital statistics, a particular hospital, the smartphone manufacturer, a licensing agency, etc.). In some embodiments, the user may be prompted to approve providing the answer to query device 130. For example, the query and the answer may displayed in the user interface of client application 122, and the user may be prompted to confirm that the answer should be provided in response to the query. If the answer is unsatisfactory, for example, the user may wish to simply end the interaction rather than provide the answer. Alternatively, if the user determines that the query asks for information that the user does not wish to provide to the requesting party, the user may choose not to provide the answer. In some embodiments, the user may also be allowed to define the parameters within which the information may be accessed by the requesting party. For example, the user may be prompted to identify a time period within which the information is made available to the requesting party. As another example, the user may specify that the information is only available for a single use, after which it will no longer be available to the requesting party.

At 370, client device 120 provides the answer to query device 130. This may be accomplished, for example, by transmitting the answer from client application 122 executing on client device 120 to query application 132 executing on query device 130. As discussed above, according to monetization contracts which may be associated with the information from data store 140, client device 120 may request payment (e.g., by sending an invoice and receiving payment information in response) from query device 130 before providing the answer. The answer may, in some cases, be accompanied by a digital signature verifying the provenance of the data. The answer may also be encrypted, such that only a trusted recipient may access its content. In other embodiments, the answer may be provided by displaying it in a user interface of client application 122. The answer may, in some cases, be displayed in the form of a bar code, such as a QR code, and may be captured by an image capture device, such as a camera, of query device 130. Alternatively, the answer may be transmitted from client device 120 to query device 130 (e.g., over the internet, directly via near field communication (NFC), over a cellular network, using Bluetooth, over a wired or wireless network, indirectly via a server, and the like).

Figure 4:
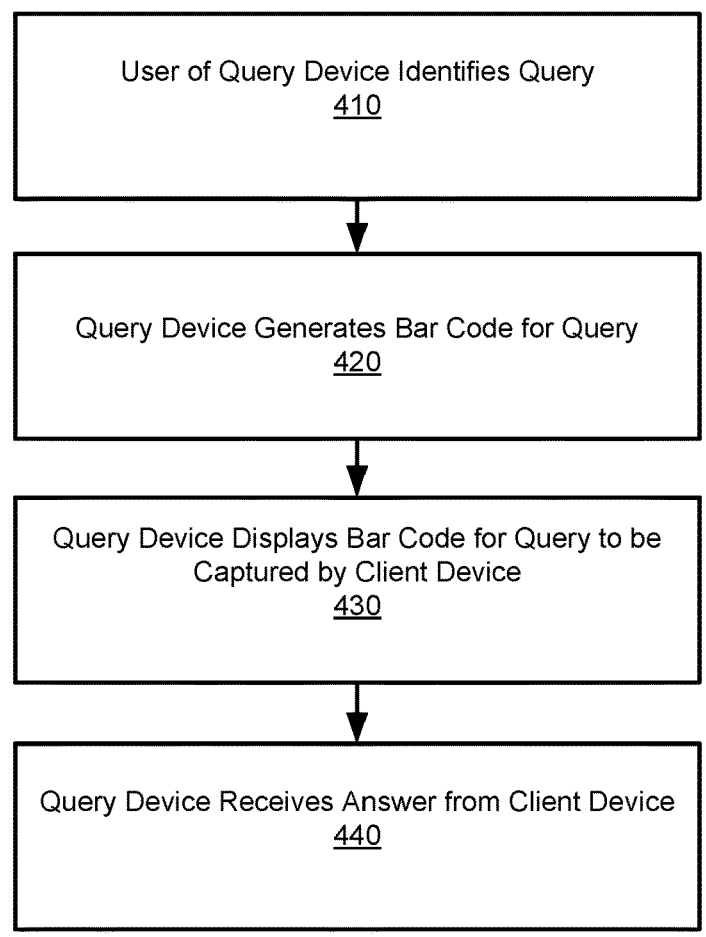
FIG. 4 illustrates example operations for providing a query in the form of a bar code according to certain embodiments.

FIG. 4 illustrates example operations 400 for providing a query in the form of a bar code according to certain embodiments. Operations 400 may, for example, be implemented by query device 130.

At 410, the user of query device 130 identifies a query to be provided to client device 120. For example, the user may select a query from a list of queries defined in advance (e.g., downloaded from a provider of query application 132). In another embodiment, the user may define the query himself (e.g., by entering a question and trusted authority into a user interface of query application 132). The query may comprise both a question and a trusted authority upon which the answer to the question is to be based.

At 420, query device 130 generates a bar code, such as a QR code, for the query. The bar code may comprise an encoded version of the query which, when captured by another device, can be decoded to obtain the question and the identification of the trusted authority upon which the answer to the question is to be based.

At 430, query device 130 displays the bar code for the query to be captured by client device 120. For example, the bar code may be displayed in the user interface of query application 132 executing on query device 130. When the bar code is displayed, the user of query device 130 may present the bar code to the user of client device 120. For example, the user of client device 120 may use an image capture device, such as a camera, of client device 120 to capture the bar code. Client application 122 executing on client device 120 may then receive the captured image and extract the query from the bar code. Once client application 122 has identified the question and the trusted authority upon which the answer to the question is to be based, client application 122 may continue with identifying the information needed to answer the question, prompting the user for credentials, retrieving the information from data store 140 using the credentials, determining an answer to the question based on the information, and providing the answer to query device 130. In some embodiments, the answer may be provided to query device 130 in the form of a bar code as well.

At 440, query device 130 receives the answer to the query from client device 120. Query device 130 may then determine whether the answer is based on information certified by a trusted authority identified in the query, such as by examining a digital signature associated with the answer. Query device 130 may then display the answer in a user interface of query application 132.

Embodiments of the present disclosure may be performed in a variety of different contexts. One example of a context in which the present disclosure may be employed involves a customer and a bouncer at a bar. The bouncer may need to verify that the customer has reached the minimum drinking age, such as 21, before granting the customer admittance to the bar. While a conventional means of verifying a customer's age involves checking a driver's license or other form of identification, this may involve sharing more sensitive information than is necessary. A driver's license, for example, generally lists a customer's residential address, which is beyond the scope of the information needed. The present disclosure provides a means of verifying that a customer has reached a minimum age without requiring the customer to provide additional, irrelevant sensitive information. The customer and the bouncer may both, in advance, download and install applications (e.g., client application 122 and query application 132) on their mobile devices (e.g. client device 120 and query device 130). The customer may, after installing client application 122, request that the state department of vital statistics certify the customer's age via a secure, verified account on a data store 140 (e.g. blockchain) associated with client application 122. The bouncer may identify a query that asks whether the customer has reached the age of 21, and require that the answer must be based on information certified by the state department of vital statistics. The bouncer may then provide the query from query device 130 to the customer on client device 120 (e.g., by transmitting the query or displaying a bar code to be captured). At this point, client application 122 may determine the information needed to answer the query, prompt the customer for credentials (e.g., for the customer's account on the data store 140), retrieve the information from the data store 140 using the credentials, determine the answer to the question, and provide the answer to query device 130, the answer indicating that it is based on information certified by the state department of statistics. At this point, provided that the answer indicates that the customer has reached the age of 21, the bouncer grants the customer admission to the bar.

Embodiments of the present disclosure may also be employed in other contexts. For example, a financial institution may submit a query to a customer regarding the customer's financial history or credit information. A landlord may submit a query to a prospective tenant regarding the prospective tenant's income or rental history. A police officer may submit a query to a driver during a traffic stop regarding the driver's license, registration, and car insurance. An employer may submit a query to a prospective employee regarding the prospective employee's education, citizenship, licenses, or employment history.

A user may store a variety of information in the user's account on trusted repositories 142 of data store 140, each piece of information immutably stored and certified by a trusted authority with maintains a trusted repository 142. For example, the user may have the state department of motor vehicles certify the user's driver's license, an employer certify the user's employment and income, a doctor certify details of the user's medical history and conditions, an education institution certify the user's degrees and transcripts, etc. All of this information may be useful in securely and reliably answering queries from different individuals and institutions. Because the information is certified by trusted authorities, the answers to queries can be trusted as accurate by recipients.

Figure 5:
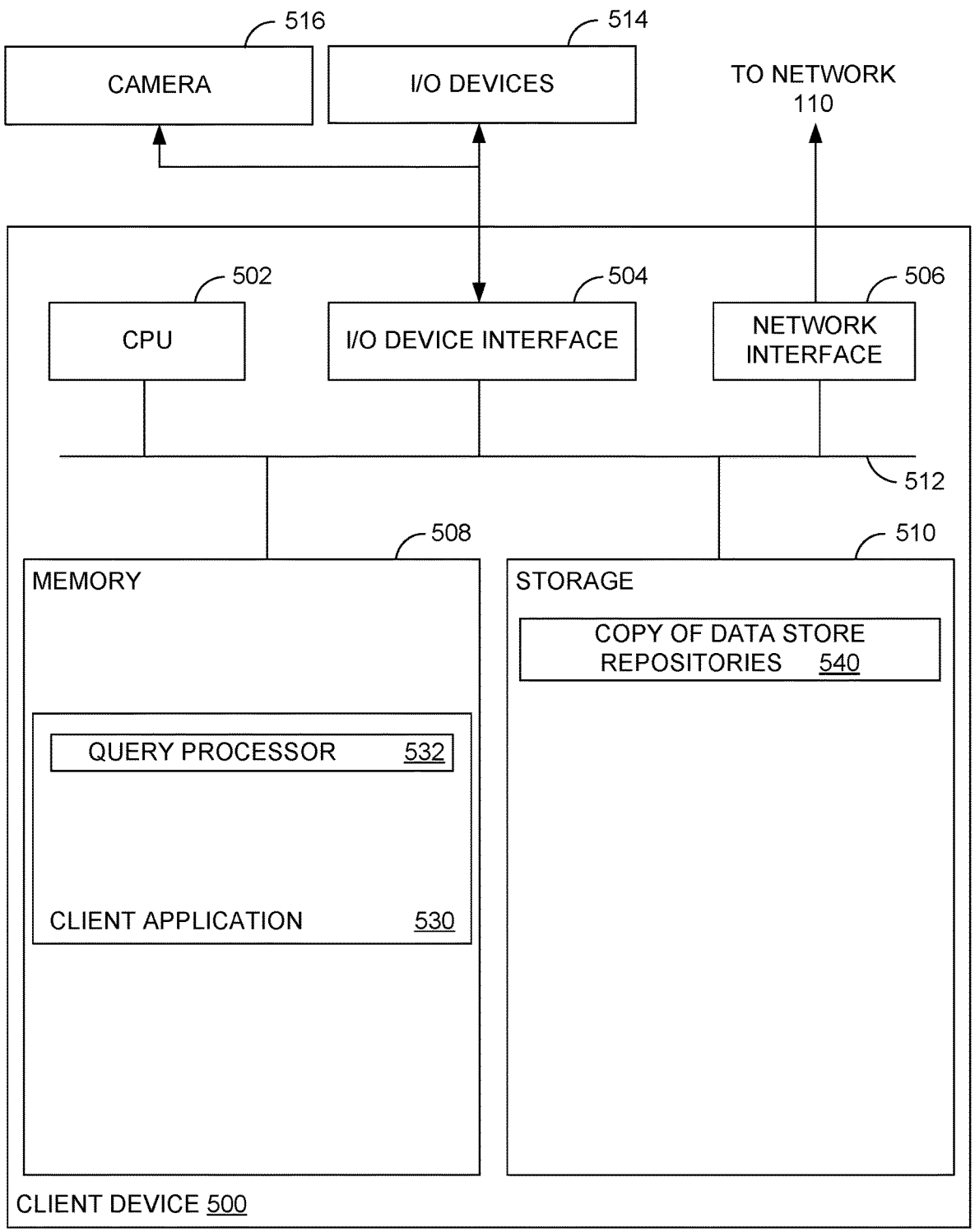
FIG. 5 illustrates a computer system with which some embodiments of the present disclosure may be implemented.

FIG. 5 illustrates an example of a client device 500 with which some embodiments of the invention are implemented. While FIG. 5 is described in the context of a client device, it could also apply to a query device. As shown, the client device 500 includes, without limitation, a central processing unit (CPU) 502, one or more I/O device interfaces 504 which may allow for the connection of various I/O devices 814 (e.g., keyboards, displays, mouse devices, pen input, etc.) and camera 516 to the mobile device 800, network interface 506, a memory 508, storage 510, and an interconnect 512. One or more components of client device 500 may be located remotely and accessed via a network.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, memory 508, and storage 510. CPU 502 is included to be representative of a single CPU, multiple CPUs, a single CPU having multiple processing cores, and the like. Additionally, the memory 508 is included to be representative of a random access memory. Furthermore, the storage 510 may be a disk drive, solid state drive, or a collection of storage devices distributed across multiple storage systems. Although shown as a single unit, the storage 510 may be a combination of fixed and/or removable storage devices, such as fixed disc drives, removable memory cards or optical storage, network attached storage (NAS), or a storage area-network (SAN).

As shown, memory 508 generally includes a client application 530, which comprises a query processor 532. Query processor 532 generally receives a query from a separate device, determines information needed to answer the query and one or more trusted authorities upon which the answer to the query is to be based (e.g., based on information included in the query), prompting a user for credentials, retrieves the information from a data store using the credentials, determines an answer to the query using the information, and provides the answer to the separate device.

As shown, storage 510 includes a copy of data store repositories 540. The copy of data store repositories 540 generally comprises a local copy of information stored on trusted repositories of a separate data store. The copy of data store repositories 540 may allow a user's information to be retrieved more efficiently, as the local copy can be used rather than accessing a remote data store.

Camera 516 generally includes still image and video capture capabilities and generally outputs images and/or video frames to a buffer or other temporary storage for use in query processing. Camera 516 may actively record image data when a user scans an image (e.g., a bar code). While camera 516 is actively recording image data, camera 516 may continually adjust focus and exposure settings in response to commands generated by an image capture application executing on client device 500 to obtain a clear image.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for a trustworthy data exchange, comprising:

receiving, from a device, a query, wherein the query comprises a question;

identifying particular information related to the query;

retrieving the particular information related to the query from one or more data repositories storing data verified by a trusted authority, wherein the one or more data repositories are part of a distributed database comprising an immutable data store that maintains a verifiable history of changes to information stored in the distributed database;

determining, based on the particular information related to the query, an answer to the query; and providing the answer to the device, wherein the answer indicates that the answer is based upon information certified by the trusted authority.

2. The computer-implemented method of claim 1, wherein the query is received by capturing a bar code displayed on the device.

3. The computer-implemented method of claim 1, wherein providing the answer to the device comprises:

displaying the answer to a user, prompting the user to approve providing the answer to the device, and upon receiving user approval, transmitting the answer to the device.

4. The computer-implemented method of claim 1, further comprising establishing a shared secret with the device, wherein providing the answer is based on establishing the shared secret.

5. The computer-implemented method of claim 1, wherein the query and the answer are exchanged with the device within a trusted environment in which communications with the device are assumed to be authentic.

6. The method of claim 1, wherein the particular information comprises a dependency relationship with additional information stored in the one or more data repositories.

7. The method of claim 6, further comprising resolving the dependency relationship based on the additional information prior to retrieving the particular information related to the query from the one or more data repositories.

8. A computer-implemented method for a trustworthy data exchange, comprising:

receiving, by a client device from a query device, a query, wherein the query comprises a question;

identifying, by the client device, particular information related to the query;

retrieving, by the client device, the particular information related to the query from one or more data repositories storing data verified by a trusted authority, wherein the one or more data repositories are part of a distributed database comprising an immutable data store that maintains a verifiable history of changes to information stored in the distributed database;

determining, by the client device, based on the particular information related to the query, an answer to the query; and providing, by the client device, the answer to the query device, wherein the answer indicates that the answer is based upon information certified by the trusted authority.

9. The computer-implemented method of claim 8, wherein the query is received by capturing a bar code displayed on the query device.

10. The computer-implemented method of claim 8, wherein providing the answer to the query device comprises:

displaying, by the client device, the answer to a user, prompting, by the client device, the user to approve providing the answer to the query device, and upon receiving user approval, transmitting, by the client device, the answer to the query device.

11. The computer-implemented method of claim 8, further comprising establishing, by the client device, a shared secret with the query device, wherein providing the answer is based on establishing the shared secret.

12. The computer-implemented method of claim 8, wherein the query and the answer are exchanged with the query device within a trusted environment in which communications between the client device and the query device are assumed to be authentic.

13. The method of claim 8, wherein the particular information comprises a dependency relationship with additional information stored in the one or more data repositories.

14. The method of claim 13, further comprising resolving, by the client device, the dependency relationship based on the additional information prior to retrieving the particular information related to the query from the one or more data repositories.

15. A system for a trustworthy data exchange, comprising:
one or more processors; and
a memory comprising instructions that, when executed by the one or more processors, cause the system to:
receive, from a device, a query, wherein the query comprises a question;
identify particular information related to the query;
retrieve the particular information related to the query from one or more data repositories storing data verified by a trusted authority, wherein the one or more data repositories are part of a distributed database comprising an immutable data store that maintains a verifiable history of changes to information stored in the distributed database;
determine, based on the particular information related to the query, an answer to the query; and
provide the answer to the device, wherein the answer indicates that the answer is based upon information certified by the trusted authority.

16. The system of claim 15, wherein the query is received by capturing a bar code displayed on the device.

17. The system of claim 15, wherein providing the answer to the device comprises:
displaying the answer to a user,
prompting the user to approve providing the answer to the device, and
upon receiving user approval, transmitting the answer to the device.

18. The system of claim 15, wherein the instructions, when executed by the one or more processors, further cause the system to establish a shared secret with the device, wherein providing the answer is based on establishing the shared secret.

19. The system of claim 15, wherein the query and the answer are exchanged with the device within a trusted environment in which communications with the device are assumed to be authentic.

20. The system of claim 15, wherein the particular information comprises a dependency relationship with additional information stored in the one or more data repositories.

* * * * *